US006534567B1

(12) United States Patent
Humbert et al.

(10) Patent No.: US 6,534,567 B1
(45) Date of Patent: Mar. 18, 2003

(54) METHOD FOR MAKING AN ORGANO-SOLUBLE (METH)ACRYLIC RESIN COMPOSITION, AND USE OF SAME AS BINDING AGENT FOR ANTIFOULING MARINE PAINTS

(75) Inventors: Marie Humbert, Saint Marcel (FR); Alain Riondel, Forbach (FR); Eric Jouandon, Cuers (FR); Andre Margaillan, Gareoult (FR); Michel Camail, Camps la Source (FR); Jean-Louis Vernet, La Farlede (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/868,166

(22) PCT Filed: Dec. 21, 1999

(86) PCT No.: PCT/FR99/03227

§ 371 (c)(1),
(2), (4) Date: Jan. 31, 2002

(87) PCT Pub. No.: WO00/39225

PCT Pub. Date: Jul. 6, 2000

(30) Foreign Application Priority Data

Dec. 23, 1998 (FR) ............................................ 98 16365

(51) Int. Cl.[7] ............................................. C09J 101/00
(52) U.S. Cl. ....................................................... 523/177
(58) Field of Search .......................................... 523/177

(56) References Cited

U.S. PATENT DOCUMENTS

| 4,121,028 A | | 10/1978 | Marchessault |
| 5,674,941 A | * | 10/1997 | Cho ........................... 525/102 |

FOREIGN PATENT DOCUMENTS

| EP | 0342276 | 11/1989 |
| EP | 0779304 | 6/1997 |
| EP | 0825203 | 2/1998 |
| GB | 1211469 | 11/1970 |
| GB | 2058801 | 4/1981 |

* cited by examiner

Primary Examiner—Edward J. Cain
(74) Attorney, Agent, or Firm—Millen, White, Zelano & Branigan, P.C.

(57) ABSTRACT

The invention concerns a method for making an organo-soluble (meth)acrylic resin composition which consists in: esterifying the COOH functions of a polymer comprising units derived from methacrylic acid, in a solvent medium, with $Ti(OR)_4$, R representing one among ethyl, isopropyl, n-butyl, t-butyl, 2-ethylhexyl and t-amyl. The invention is characterised in that the esterification is carried out in the presence of at least a R'COOH monocarboxylic acid, R' representing a linear, branched or cyclic $C_1$–$C_{18}$ alkyl radical; aryl; alkaryl; or aralkyl, by stopping esterification before a gel is formed, when the COOH resin and R'COOH functions have been added with a molar ratio $Ti(OR)_4$/—COOH functions of the resin ranges between 1 and 3, and a molar ratio $R'COOH/Ti(OR)_4$ ranges between 1 and 6.

29 Claims, No Drawings

METHOD FOR MAKING AN ORGANO-SOLUBLE (METH)ACRYLIC RESIN COMPOSITION, AND USE OF SAME AS BINDING AGENT FOR ANTIFOULING MARINE PAINTS

The present invention relates to the preparation of a (meth)acrylic resin organosoluble composition, of use in particular as binder in anti-fouling marine paints, which has a self-polishing nature and which does not have a negative ecotoxicological impact with respect to the marine environment. The invention also relates to the corresponding paint compositions.

The use of acrylic monomers carrying titanate groups has been disclosed for the preparation of crosslinked polymer particles which can be used as fillers in antifouling marine paint compositions. These particles would have the property of disintegrating in a slightly basic medium, in particular in seawater, and of resulting in self-polishable coatings.

However, it was advantageous to have available organo-soluble resins of use as binders in antifouling marine paint compositions.

The applicant company then discovered that, during the esterification of polymers carrying methacrylic acid functional groups by tetraalkoxytitaniums, the use of an excess of the latter with respect to the —COOH functional groups would make it possible to obtain organosoluble reaction products of use as binders in marine paints. It is the same when a trialkoxytitanium methacrylate is copolymerized by the radical route with at least one comonomer in the presence of tetraalkoxytitanium. The products obtained in both cases are, before evaporation, soluble in conventional organic solvents (toluene, xylene or ether alcohols), in which they are generally prepared. After the evaporation of the solvent, they are no longer soluble (in said solvent or in said solvents). The rate of erosion of coatings (paints) prepared with these products as binders, evaluated by direct measurement on paint formulations, is constant over time.

Thus it is that, in the case of French patent application No. 2 752 581, the disclosure was made of a (meth)acrylic resin organosoluble composition comprising a polymer comprising units derived from methacrylic acid which are esterified by —Ti(OR)$_3$ groups as a mixture with free Ti(OR)$_4$, which represents the excess of the Ti(OR)$_4$ which has been introduced for the preparation of said polymer in a sufficient amount for the resulting composition to be organosoluble and not in the form of a gel, R representing one from ethyl, isopropyl, n-butyl, t-butyl, 2-ethylhexyl and t-amyl.

These organosoluble compositions give complete satisfaction as binders in antifouling marine paints. However, the presence of an excess of Ti(OR)$_4$ does not render them very economic.

During its research studies targeted at lowering the threshold of Ti(OR)$_4$ in these compositions in order to solve the above problem, the applicant company has discovered, surprisingly, that the addition of a monocarboxylic acid during the functionalization of a resin comprising units derived from methacrylic acid makes it possible to use a lower amount of Ti(OR)$_4$ than in the prior state of the art represented by the abovementioned French application No. 2 752 581, it advantageously being possible for this amount to be close to stoichiometry with respect to the —COOH functional groups of the resin, without the appearance of insoluble gels.

A subject matter of the present invention is thus a process for the manufacture of a (meth)acrylic resin organosoluble composition, according to which the esterification is carried out of the —COOH functional groups of a polymer comprising units derived from ethacrylic acid, in a solvent medium, by Ti(OR)$_4$, R representing one from ethyl, isopropyl, n-butyl, t-butyl, 2-ethylhexyl and t-amyl, characterized in that the esterification is carried out in the presence of at least one monocarboxylic acid R'COOH, R' representing a linear, branched or cyclic $C_1$–C18 alkyl radical; an aryl radical; an alkaryl radical; or an aralkyl radical, the esterification being halted before the formation of a gel when the —COOH functional groups of the resin and of R'COOH have been added with a Ti(OR)$_4$/—COOH functional groups of the resin molar ratio of between 1 and 3, in particular between 1.1 and 2, and an R'COOH/Ti(OR)$_4$ molar ratio of between 1 and 6, in particular between 2 and 4.

Mention may be made, as examples of monocarboxylic acids R'COOH which can be used for the implementation of the process as claimed in the present invention, of acetic, butyric, hexanoic, decanoic, 2-methylhexanoic and 2-ethylhexanoic acids, benzoic acid, hydrocinnamic acid, acrylic acid and methacrylic acid.

The esterification is preferably carried out at a temperature of 10 to 50° C. at atmospheric pressure and for a duration of 10 to 36 hours; particularly preferred temperature and duration conditions are respectively from 15 to 35° C. and from 16 hours to 24 hours.

Furthermore, the esterification is advantageously carried out in a solvent medium composed of toluene, xylene, ether alcohols, such as 2-methoxyethanol, 1-methoxy-2-propanol or 2-ethoxypropanol, and their mixtures.

The polymer comprising methacrylic acid units which are subjected to the esterification as claimed in the present invention is in particular a copolymer of methacrylic acid and of at least one comonomer chosen from alkyl (meth) acrylates, in particular $C_1$–$C_6$ alkyl (meth)acrylates, such as methyl methacrylate, butyl methacrylate, and the like.

The (meth)acrylic resin organosoluble composition obtained is thus generally found in a solvent medium, its solids content generally being from 20–80% by weight approximately, preferably from 30 to 60% by weight approximately.

The esterification product is a crude product comprising an alcohol formed which acts as cosolvent.

Another subject matter of the present invention is an antifouling marine paint composition, characterized in that it comprises, as binder, the (meth)acrylic resin organosoluble composition obtained by the process as defined above.

The paint composition is otherwise conventional, being able to comprise the usual other ingredients, such as:

adjuvants, such as soybean lecithin, modified hydrogenated castor oil or viscosity stabilizers (such as Viscostab CNF 896, manufactured by Elf Aquitaine);
  pigments and fillers, such as zinc oxide (nonacicular), cuprous oxide and rutile titanium oxide; and
  solvents and diluents, such as solvent naphtha, toluene and xylene.

The following examples illustrate the present invention without, however, limiting the scope thereof.

The resin Elvacite® 2669 used, manufactured by ICI and supplied to the applicant company by SPCI, is an acrylic resin which is soluble in slightly alkaline water; it is a tetrapolymer which comprises, in addition to the methacrylic acid units, methyl methacrylate, ethyl methacrylate and ethyl acrylate units. Acid number indicated by the manufacturer: 124; molecular mass indicated by the manufacturer: 60,000; Tg=100° C.

Furthermore, in these examples, EH means the 2-ethylhexyl radical.

EXAMPLE 1

(Comparative).
Esterification of the Resin Elvacite® 2669 by Ti(OEH)$_4$ at a Ti/COOH$_{Elva}$ Molar Ratio of 2.5/1

20.6 g of Ti(OEH)$_4$ (3.647×10$^{-2}$ mol) are poured into a 250 ml round-bottomed flask surmounted by a pressure-equalizing dropping funnel.

A solution comprising 11 g of Elvacite® 2669 (2.43×10$^{-2}$ mol of COOH functional groups) dissolved in 42 g of xylene and 31.7 g of 2-ethoxypropanol (xylene/2-ethoxypropanol ratio per mass: 57/43) is then prepared in a round-bottomed flask. The mixture is left to stir until the polymer has completely dissolved.

This solution is poured into a dropping funnel and then added dropwise with magnetic stirring. Addition is halted when a light gel appears, which is reflected by the disappearance of the vortex due to stirring.

The Ti/COOH$_{Elva}$ ratio at the formation of the gel is 2.5/1.

EXAMPLE 2

Esterification of the Resin Elvacite® 2669 by Ti(OEH)$_4$ at a Ti/COOH$_{Elva}$ Molar Ratio of 1.7/1

A Ti(OEH)$_4$ round-bottomed flask and an Elvacite® 2669 round-bottomed flask are prepared under the same conditions as in Example 1. 7.3 g of acetic acid (0.215 mol) are added to the Elvacite® 2669 solution. The amount of acid added is calculated so as to have four acid functional groups per titanium atom, for an ideal Ti/COOH$_{Elva}$ threshold of 1.5/1 (3.647×10$^{-2}$/2.43×10$^{-2}$).

Calculation of the Number n of Moles of Acetic Acid to be Added for a Ti/COOH$_{Elva}$ Ratio Fixed at 1.5/1

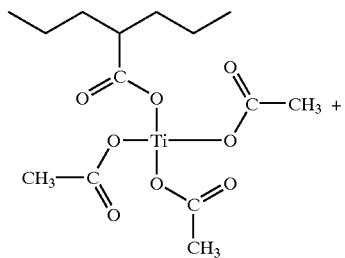

In this case, n=3×(2.43×10$^{-2}$)+4×(3.647×10$^{-2}$−2.43×10$^{-2}$)= 0.1215 mol This solution (Elvacite®+acetic acid) is poured into the dropping funnel and then added dropwise with magnetic stirring. Addition is halted when a light gel appears, which is reflected by the disappearance of the vortex due to the stirring. At the appearance of the gel, the mass added was 80 g. This addition will have lasted approximately 24 hours.

At the formation of the gel, 2.128×10$^{-2}$ mol of COOH functional groups of the Elvacite® will thus have been added. The Ti/COOH$_{Elva}$ ratio is thus 1.7/1.

1.064×10$^{-1}$ mol of acetic acid will thus have been added. The COOH$_{total}$/Ti ratio will thus be 3.5/1.

EXAMPLES 3 to 9

6.24 g of Ti(OEH)$_4$ (1.1048×10$^{-2}$ mol) are poured into a 250 ml round-bottomed flask surmounted by a pressure-equalizing dropping funnel.

A solution comprising 5 g of Elvacite® 2669 (1.1048×10$^{-2}$ mol of COOH functional groups) dissolved in 25.63 g of xylene and 19.33 g of 2-ethoxypropanol (xylene/2-ethoxypropanol ratio by mass: 57/43) is then prepared in a round-bottomed flask. The mixture is left to stir until the polymer has completely dissolved.

3.3144×10$^{-2}$ mol of an acid, as indicated in the following Table 1, is added to this solution. The amount of acid added is calculated so as to have four acid functional groups per titanium atom, for an ideal Ti/COOH$_{Elva}$ threshold of 1/1.

Calculation of the Number n of Moles of Acid to be Added for an Ideal Ti/COOH$_{Elva}$ Ratio Fixed at 1/1

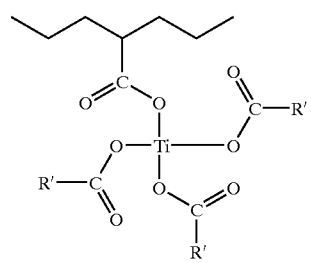

R' is as defined above
n=3×1.1048×10$^{-2}$=3.3144×10$^{-2}$

This solution is poured into the dropping funnel and then added dropwise with magnetic stirring. Addition is halted when a light gel appears, which is reflected by the disappearance of the vortex due to the stirring. At the appearance of the gel, the mass of acid added is measured. The addition lasts approximately 24 hours.

Trhe Ti/COOH$_{Elva}$ ratio at the gel point and the COOH$_{total}$/Ti ratio at the gel point are shown in the following Table 1 for the various carboxylic acids tested.

TABLE 1

| Example | Acid | Ti/COOH$_{Elva}$ ratio at the gel point | COOH$_{total}$/Ti ratio at the gel point |
|---|---|---|---|
| 3 | butyric CH$_3$—(CH$_2$)$_2$—COOH | 1.4/1 | 2.8/1 |
| 4 | hexanoic CH$_3$—(CH$_2$)$_4$—COOH | 1.5/1 | 2.7/1 |
| 5 | decanoic CH$_3$—(CH$_2$)$_8$—COOH | 1.4/1 | 2.9/1 |
| 6 | benzoic C$_6$H$_5$—COOH | 1.3/1 | 3/1 |
| 7 | hydrocinnamic C$_6$H$_5$—(CH$_2$)$_2$—COOH | 1.5/1 | 2.6/1 |
| 8 | 2-methylhexanoic CH$_3$—(CH$_2$)$_3$—CH(CH$_3$)—COOH | 1/1 | 4/1 |
| 9 | 2-ethylhexanoic CH$_3$—(CH$_2$)$_3$—CH(C$_2$H$_5$)COOH | 1/1 | 4/1 |

EXAMPLE 10

Esterification of the Resin Elvacite® 2669 by Ti(OEH)$_4$ at a Ti/COOH$_{Elva}$ Molar Ratio of 1.5/1 or of 1.1/1

The preparation is carried out as in Example 2, except that acetic acid is replaced by 2-ethylhexanoic acid.

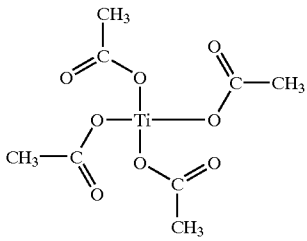

68% of the solution ($1.1048 \times 10^{-2}$ mol of $COOH_{Elva}$ functional groups+$3.3144 \times 10^{-2}$ mol of 2-ethylhexanoic acid) are added over 48 hours. This mixture is left to stir for 12 days. No setting to a gel was then noticed.

In other words, after having added $7.51 \times 10^{-3}$ mol of $COOH_{Elva}$ functional groups, the Ti/$COOH_{Elva}$ ratio is 1.5/1.

$2.25 \times 10^{-2}$ mol of 2-ethylhexanoic acid will also have been added; the $COOH_{total}$/Ti ratio will thus be 2.7/1.

A further 20% of the addition solution are added until the gel appears. The mass of acid added is measured.

At the setting to a gel, 90.32% of the starting mass has been added, that is to say $9.98 \times 10^{-3}$ mol of $COOH_{Elva}$ functional groups. The Ti/$COOH_{Elva}$ ratio is thus 1.1/1.

$2.99 \times 10^{-2}$ mol of 2-ethylhexanoic acid will also have been added. The $COOH_{total}$/Ti ratio will thus be 3.6/1.

EXAMPLE 11

13.6 g of Ti(OEH)$_4$ ($2.407 \times 10^{-2}$ mol) are poured into a 250 ml round-bottomed flask surmounted by a pressure-equalizing dropping funnel.

A solution comprising 4.47 g of Elvacite® 2669 ($9.89 \times 10^{-3}$ mol of COOH functional groups) dissolved in 16.6 g of o-xylene and 12.6 g of 2-methoxypropanol (xylene/2-methoxypropanol ratio by mass 57/43) is then prepared in a round-bottomed flask. The mixture is left to stir until the polymer has completely dissolved. The Ti/$COOH_{Elva}$ ratio is then fixed at 2.5/1.

2.9 g of acetic acid ($4.84 \times 10^{-2}$ mol) are added to this solution. The amount of acid added corresponds in this instance to a $COOH_{total}$/Ti ratio of 2.45/1.

This solution is poured into the dropping funnel and then added dropwise with magnetic stirring. All the solution is poured in. In total, the addition will have lasted approximately 10 hours.

An additional study has made it possible to show that, in the case of this Example 11, all the acetic acid added was completely incorporated.

What is claimed is:

1. A process for the manufacture of a (meth)acrylate resin organosoluble composition, comprising esterifying —COOH functional groups of a polymer comprising units derived from methacrylic acid, with Ti(OR)$_4$ in a solvent medium, R representing ethyl, isopropyl, n-butyl, t-butyl, 2-ethylhexyl or t-amyl, the esterification being carried out in the presence of at least one acid selected from the group consisting of acrylic acid, methacrylic acid and a monocarboxylic acid R'COOH, R' representing a linear, branched or cyclic C$_1$–C$_{18}$ alkyl radical; an aryl radical; an alkaryl radical; or an aralkyl radical, with a molar ratio of Ti(OR)4/—COOH functional groups of the polymer being between 1 and 3 and a molar ratio of acid/Ti(OR)$_4$ being between 1 and 6, the esterification being halted before the formation of a gel.

2. The process as claimed in claim 1, wherein the acid is selected from the group consisting of acetic, butyric, hexanoic, decanoic, 2-methylhexanoic and 2-ethylhexanoic acids, benzoic acid, hydrocinnamic acid, acrylic acid and methacrylic acid.

3. A process according to claim 1 wherein the molar ratio of Ti(OR)4/—COOH functional groups of the resin is between 1.1 and 2.

4. A process according to claim 1 wherein the acid/Ti(OR)$_4$ molar ratio is between 2 and 4.

5. A process according to claim 1 wherein the esterification is carried out at a temperature of 10 to 50° C.

6. A process according to claim 1 characterized in that the esterification is carried out at atmospheric pressure.

7. A process according to claim 1 wherein the esterification is carried out for 10 to 36 hours.

8. A process according to claim 1 wherein the esterification is carried out in a solvent medium compound of at least one of toluene, xylene, and an ether alcohol.

9. A process according to claim 1 wherein the polymer comprising methacrylic acid units is a copolymer of methacrylic acid and of at least one alkyl (meth)acrylate.

10. A process according to claim 8 resulting in a (meth) acrylic resin organosoluble composition having a solids content of 20–80% by weight.

11. A (meth)acrylic resin organosoluble composition obtained by a process according to claim 1.

12. An antifouling marine paint composition comprising a (meth)acrylic resin organosoluble composition according to claim 11.

13. A composition according to claim 12 further comprising:

at least one adjuvant selected from the group consisting of soybean lecithin, modified hydrogentated castor oil and a viscosity stabilizer;

at least one pigment or filler selected from the group consisting of zinc oxide (nonacicular), cuprous oxide and rutile titanium oxide; and at least one solvent or diluent.

14. A composition according to claim 11 wherein the polymer is a copolymer of methacrylic acid and at least one alkyl (meth)acrylate.

15. A process comprising coating a marine article with a composition organosoluble composition according to claim 14.

16. A process according to claim 15, wherein said composition further comprises:

at least one adjuvant selected from the group consisting of soybean lecithin, modified hydrogentated castor oil and a viscosity stabilizer;

at least one pigment or filler selected from the group consisting of zinc oxide (nonacicular), cuprous oxide and rutile titanium oxide; and at least one solvent or diluent.

17. A process according to claim 1 conducted at a temperature of 15–35° C. for 16–24 hours.

18. A process according to claim 8 wherein the solvent medium comprises at least one ether alcohol selected from the group consisting of 2-methoxyethanol, 1-methoxy-2-propanol and 2-ethoxypropanol.

19. A process according to claim 9 wherein the alkyl (meth)acrylate is a C$_1$–C$_6$ alkyl(meth)acrylate.

20. A process according to claim 10 wherein the solids content is 30–60% by weight.

21. A process according to claim 3, wherein the acid/Ti (OR)$_4$ molar ratio is between 2 and 4.

22. A process according to claim 3, wherein the esterification is carried out in a solvent medium compound of at least one of toluene, xylene, and an ether alcohol.

23. A process according to claim 22, resulting in a (meth)acrylate resin organosoluble composition having a solids content of 20–80% by weight.

24. A process according to claim 3, wherein the polymer comprising methacrylic acid units is a copolymer of methacrylic acid and of at least one alkyl (meth)acrylate.

25. A methacrylic acid resin organosoluble composition obtained by a process according to claim 3.

26. An antifouling marine paint composition comprising a (meth)acrylic resin organosoluble composition according to claim 25.

27. A composition according to claim 26, wherein the polymer is a copolymer of methacrylic acid and at least one alkyl (meth)acrylate.

28. A process comprising coating a marine article with a composition comprising an organosoluble composition according to claim 27.

29. A process according to claim 28, wherein said composition further comprises:
- at least one adjuvant selected from the group consisting of soybean lecithin, modified hydrogentated castor oil and a viscosity stabilizer;
- at least one pigment or filler selected from the group consisting of zinc oxide (nonacicular), cuprous oxide and rutile titanium oxide; and
- at least one solvent or diluent.

* * * * *